US010358005B2

(12) United States Patent
McClellan

(10) Patent No.: US 10,358,005 B2
(45) Date of Patent: Jul. 23, 2019

(54) SYSTEM AND METHOD FOR GRAVITY-DRIVEN AUTOMATIC TIRE PUMPS

(71) Applicant: INTELLIAIRE, LLC, Park City, UT (US)

(72) Inventor: Scott McClellan, Park City, UT (US)

(73) Assignee: INTELLIAIRE, LLC, Park City, UT (US)

( * ) Notice: Subject to any disclaimer, the term of this patent is extended or adjusted under 35 U.S.C. 154(b) by 18 days.

(21) Appl. No.: 15/210,696

(22) Filed: Jul. 14, 2016

(65) Prior Publication Data

US 2017/0015156 A1  Jan. 19, 2017

Related U.S. Application Data

(60) Provisional application No. 62/192,337, filed on Jul. 14, 2015.

(51) Int. Cl.
*B60C 23/04* (2006.01)
*B60C 23/12* (2006.01)

(52) U.S. Cl.
CPC .......... *B60C 23/12* (2013.01); *B60C 23/0408* (2013.01); *B60C 23/0479* (2013.01)

(58) Field of Classification Search
CPC .. B60C 23/12; B60C 23/0408; B60C 23/0479
USPC ...................................................... 152/419
See application file for complete search history.

(56) References Cited

U.S. PATENT DOCUMENTS

| | | | | |
|---|---|---|---|---|
| 1,643,945 A * | 10/1927 | Crook | ...................... | B60C 23/12 152/418 |
| 2,055,983 A * | 9/1936 | Peo | .......................... | B60C 23/12 417/233 |
| 5,201,968 A * | 4/1993 | Renier | ..................... | B60C 23/12 152/415 |
| 5,409,049 A * | 4/1995 | Renier | ..................... | B60C 23/12 152/418 |
| 5,707,215 A * | 1/1998 | Olney | ...................... | B60C 23/12 152/418 |
| 6,504,271 B2 * | 1/2003 | Chass | .................... | B60C 23/041 310/11 |

(Continued)

FOREIGN PATENT DOCUMENTS

| | | | | |
|---|---|---|---|---|
| EP | 0855294 A2 * | 7/1998 | .............. | B60C 23/12 |
| WO | WO 2010141638 A1 * | 12/2010 | .............. | B60C 23/12 |

*Primary Examiner* — Kip T Kotter

(57) ABSTRACT

Systems, methods, and computer-readable storage media are arranged in connection with gravity-driven pumps configured in tires, as well as various supporting concepts, mechanisms, and approaches. As a tire rotates around an axle, the pull of gravity varies for a given point on the tire. While gravity is always pulling 'down', the force relative to a fixed point on the tire changes. Gravity-driven pumps exploit these changes in gravitational force to do work. The work can be driving a pump, or generating electrical power to drive a traditional electric pump or other electrical components. A gravity-driven pump is different from an automatic pump that operates using centrifugal force due to rotation of a tire. Automatic, gravity-driven pumps can be used to inflate tires to offset the natural gas leakage of modern tires, and can maintain tire pressure and inflation within a desired or optimal range.

23 Claims, 12 Drawing Sheets

(56) References Cited

U.S. PATENT DOCUMENTS

| | | | |
|---|---|---|---|
| 2007/0205881 A1* | 9/2007 | Breed | B60C 23/041 340/447 |
| 2008/0066533 A1* | 3/2008 | Beverly | B60C 23/002 73/146 |
| 2008/0156406 A1* | 7/2008 | Breed | B60C 23/041 152/415 |
| 2008/0216567 A1* | 9/2008 | Breed | B60C 11/24 73/146.5 |
| 2012/0241064 A1* | 9/2012 | Hinque | B60C 23/12 152/418 |
| 2015/0314657 A1* | 11/2015 | Lin | B60C 23/12 417/234 |
| 2016/0107491 A1* | 4/2016 | Lin | B60C 23/12 141/4 |

* cited by examiner

SYSTEM AND METHOD FOR GRAVITY-DRIVEN AUTOMATIC TIRE PUMPS

PRIORITY INFORMATION

The present application claims priority to U.S. provisional patent application 62/192,337, filed Jul. 14, 2015, the content of which is incorporated herein by reference in its entirety.

BACKGROUND

1. Technical Field

The present disclosure relates to automatic pumps for tires and more specifically to pumps that use changes in orientation due to tire rotation and gravitational force to drive pumps to automatically inflate tires.

2. Introduction

Tires are a critical part of modern transportation. However, proper tire inflation is an important factor in the safety, efficiency and cost of using tires. Neither underinflation nor overinflation is an optimal condition for tire longevity or safety. Overinflation can lead to unsafe wear patterns, lower traction and increased potential for a catastrophic failure or blowout of the tire during otherwise normal operation. Underinflation lowers the fuel efficiency of tires, increases wear, lowers the tire sidewall (lateral) stiffness making the tire less safe and increases the potential for catastrophic failure or blowout of the tire during otherwise normal operation. All rubber-based, modern tires lose some amount of gas due to the natural porosity of rubber. These porosity losses can be minimized by using larger air molecules (Nitrogen) than air. However, the porosity losses are only reduced, not eliminated.

Temperature can also affect tire inflation. Under higher temperatures, the tire pressure increases, while under lower temperatures, the tire pressure decreases. One solution is for users to manually check tire inflation periodically, but this is a difficult task, requires training, and consumes significant user time. Further, some portion of the user population will never check their tire inflation due to inconvenience, regardless of the benefits that proper inflation provide. Tire inflation is a problem that many drivers do not care enough about to invest the time to check or correct until the problem is so bad that the tire, and consequently the vehicle, become undrivable, or unsafe. An automatic approach to tire inflation that does not require end-users, i.e. the drivers of these vehicles, to spend time and effort would be significantly preferable.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein use gravity-driven pumps to automatically inflate tires in a way that offsets the loss of gas from inside the tire. The gravity-driven pumps can be mounted to the tire rim, and are activated to pump air by exploiting gravity at various orientations as the tire rotates. Different types of pumps are described herein. Further, the differences in gravity can be used to generate electricity using similar principles. This electricity can be used to power various sensors, a processor, wired and/or wireless communications interfaces, electronic storage, or even an electric pump instead of a gravity-driven pump.

In one example, a system includes a tire rim and a pump fixedly attached to the tire rim. Rotational motion of the tire rim about an axis causes gravity to move a pump element in a first direction from a first position to a second position to yield a pump stroke, wherein the pump stroke pumps a gas into a volumetric container supported by pressure different from an ambient pressure outside of the volumetric container, the volumetric container mounted to the tire rim. The rotational motion of the tire rim about the axis causes gravity to move the pump element in a second direction from the second position to the first position to yield a second pump stroke. The pump stroke can be a compression stroke and the second pump stroke can be an intake stroke. Repeating the rotational motion causes inflation of the volumetric container. The pump can be aligned with the rotational motion of the tire rim and in some cases be used for balancing the wheel at higher speeds. Work captured by the pump element is due to gravity, not centrifugal force.

The volumetric container can be an inflatable tire which can be surrounding the tire rim, and can be at least one of a heavy machinery tire, a mass transportation tire, a truck tire, a bicycle tire, a consumer car tire, and a motorcycle tire. The pump can have a pump stroke path that is one of linear and angular along the rotational motion of the tire rim. In one aspect, the pump is perpendicular to a radial line defined from a center of the tire rim to an edge of the tire rim. The pump element can be positioned and slide inside a volume or a container. The element can be a piston moving within a tube, where the piston moves in a pump stroke in such a way as to move air from one chamber into another chamber. When this structure is applied, moving air from one chamber to another chamber results in one of pumping air into the volumetric chamber or pumping air out of the volumetric chamber. The pump element can also move in such a way as to generate electricity which is stored in a storage device. The pump element can also be a non-solid mass that presses against a diaphragm. While one pump can be used, the system may also include a plurality of pumps. Each pump of the plurality of pumps can be positioned with an equal angular distance between other pumps of the plurality of pumps, resulting in a balancing of the plurality of pumps.

In one configuration, the pump(s) will operate at lower speeds but at higher speeds the tire will rotate too quickly for the pump element to actually move. In such circumstances, the pump element—due to the fast rotation—will settle into a certain position along its axis, which can cause the tire to be in (or out of) balance. As an example, the pumping element could cause the tire (or other volumetric container) to be out of balance at low speeds, however upon reaching a certain speed the pumping element can settle into a position that balances the volumetric container. Thus, continuing with the example, the volumetric container could be unbalanced at speeds below 10 miles per hour, but balanced at speeds above 10 miles per hour (10 miles per hour being an exemplary speed). In this regard, the pump also becomes an automatic balancing mechanism for the tire. The plurality of pumps can be positioned so that the tire rim and the volumetric chamber are rotationally balanced.

The system can further include a pressure sensitive valve that diverts the gas from the pump into the volumetric chamber when pressure inside the volumetric chamber is below a threshold, and diverts the gas from the pump away from the volumetric chamber when pressure inside the volumetric chamber is at or above the threshold.

DETAILED DESCRIPTION

Figure 1:
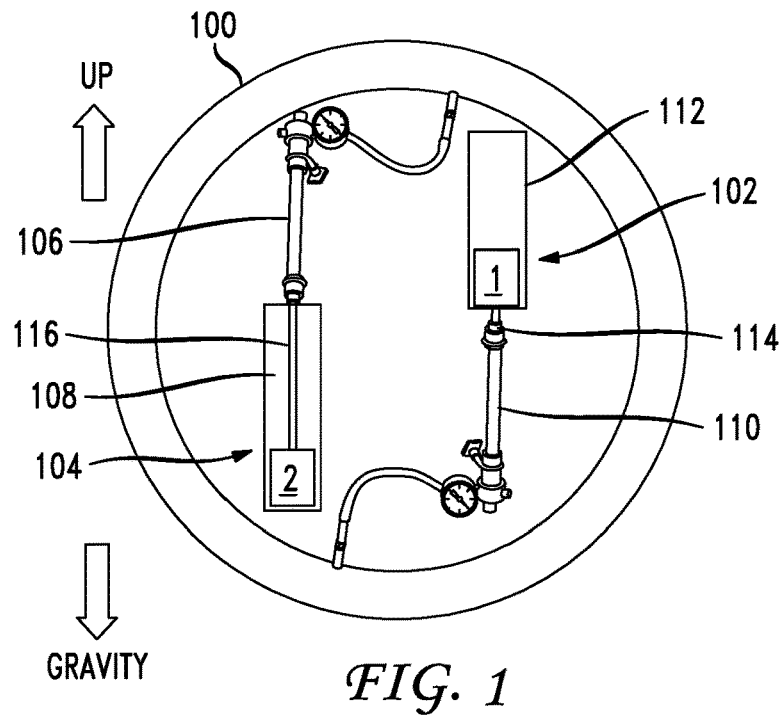
FIG. 1 illustrates an example tire with gravity-driven pumps.

A system, method and computer-readable media are disclosed for gravity-driven pumps, as well as various supporting concepts, mechanisms, and approaches. It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

Given that the present disclosure utilizes gravity as a mechanism for automatically pumping a tire, we begin with a brief discussion of the properties of gravity. Gravity has a property of an ever-present acceleration and is related to the size and density of a planet or large body generating the gravity. On earth, the gravitational acceleration is about 9.8 m/s$^2$ or 32.2 ft/s$^2$. The gravitational potential energy (U) is related to the product of the mass, gravitational acceleration and height above the surface that the mass is raised according to the equation:

$$U = mgh$$

where:
U is gravitational potential energy,
m is mass,
g is the surface value of gravity, and
h is the height above the surface (for surface calculations and small distances above the surface of the gravity generating body).

The more general, integral form of defining gravity is as follows:

$$U(r) = -\int_{\infty}^{r} \frac{-GMm}{r'^2} dr' = -\frac{GMm}{r}$$

where:
U(r) is the gravitational potential energy as a function of the distance between the bodies;
G is the gravitational constant;
M is the Mass of the attracting body;
m is the mass of the body gravity is acting upon; and
r is the distance between their centers.

Harnessing gravity or gravitational energy to perform useful work is not new: hydroelectric dams, siphons, mass pulley systems, are a few examples. In this application, we use gravity to move a mass within a chamber, which moves air from one chamber to another (in this case, moving air into a tire.). By changing the orientation of the chamber, we use gravity to create the pump stroke and intake stroke. As the tire rotates around an axle, the magnitude of the gravitational vector component varies for a given tangent on the circumference of the tire. While gravity is always pulling 'down', the force relative to a fixed tangent on the tire changes. The tangents on a circle, at 12:00 and 6:00 are parallel to each other and are horizontal in a normal, earth reference frame. The gravitational vector component is perpendicular to the tangents at 12:00 and 6:00 or pointing vertically down. In our application, at 12:00 and 6:00, gravity cannot do any constructive work due to the fact that the gravitational vector is perpendicular to the orientation of our pumping mechanism. However, the tangents on a circle at 3:00 and 9:00 are parallel with each other and are parallel with the gravitational vector. At the 3:00 and 9:00 orientations, in this application, one can utilize the full effect of gravity (the gravitational potential energy) to do constructive work. Gravity-driven pumps exploit changes in their orientation to utilize the gravitational force vector's vertical component to do work. The work can be driving a pump, or generating electrical power to drive an electric pump or other electrical components such as sensors, wireless communication devices, computing devices, or other components. A gravity-driven pump is different from an automatic pump that operates using centrifugal force due to rotation of a tire. Centrifugal force applies to virtually any rotating mass, whereas a gravity-driven pump would work when the rotational direction would cause some change in orientation of the pumping device, utilizing gravitational force to pull a pumping element in opposite directions at different rotational positions. Automatic, gravity-driven pumps can be used to inflate tires to offset the natural gas leakage of modern tires, and/or can maintain tire pressure and inflation within a designed and desired range. In one aspect, the mass can be used both to drive a pump and to generate electricity for various devices.

FIG. 1 illustrates an example tire 100 with gravity-driven pumps 102, 104. FIG. 1 illustrates the up direction which is the opposite of the pull of gravity. These example gravity-driven pumps are illustrated as large pumps for ease of demonstration, and are not necessarily to scale. The pumps 102, 104 can be much smaller, and can be embedded on or in the rim. The pumps 102, 104 can be aligned substantially parallel to the rim of the tire 100, or perpendicular to a radial line from the center of the rim to the location of the pump. These pumps have external moving parts, also for ease of demonstration, but gravity-driven pumps can include a housing within which all the moving parts are housed. In this way, the gravity-driven pump can be a modular unit. In one example, pump 102 has a chamber 112 in which a pump head "1" is configured to slide along an axis in the chamber 112. The head 1 is attached to a pump shaft 114 which moves in and out of a pressure chamber 110 of pump 102. Similar pump head "2", chamber 108, shaft 116 and pressure chamber 106 are also shown for pump 104. The basic pump structure is known and incorporated herein as included within the description of pumps 102, 104. The series of FIGS. 2A-2F show the example tire 100 at different times (or rotational positions) $T_0$-$T_5$ to illustrate how gravitational changes due to rotation cause the pumps 102, 104 to operate.

The element, or pump head, can be a piston that moves in a pump stroke in such a way as to move air from one chamber into another chamber. Moving air from one chamber to another chamber results in one of pumping air into the volumetric chamber or pumping air out of the volumetric chamber. The pump element can also move in such a way as to generate electricity which is stored in a storage device. The pump element can also be a non-solid mass that presses against a diaphragm. A system can also include a plurality of pumps. Each pump of the plurality of pumps can be positioned with an equal angular distance between other pumps of the plurality of pumps, resulting in a balancing of the plurality of pumps.

The pumping element at a rotational speed above a speed (such as 5 miles per hour) can settle into a position that aids in balancing the volumetric container. Of course the particular speed at which a pumping element can settle into a balanced position can range based on the configuration of the overall system. The plurality of pumps can be positioned so that the tire rim and the volumetric chamber are rotationally balanced. This effect provides an additional benefit to the use of the gravitational pump system disclosed herein. Because the pump element(s) move relative to the gravitational force, they can also be used to automatically balance a tire at higher rotational speeds.

The pump can also include a pressure sensitive valve that diverts the gas from the pump into the volumetric chamber when pressure inside the volumetric chamber is below a threshold, and diverts the gas from the pump away from the volumetric chamber when pressure inside the volumetric chamber is at or above the threshold. As an example, a pressure sensitive valve can divert gas from the pump into the volumetric chamber when the pressure of the volumetric chamber is below 32 psi, and away from the volumetric chamber when the pressure of the volumetric chamber is at or above 32 psi.

Figure 2A:
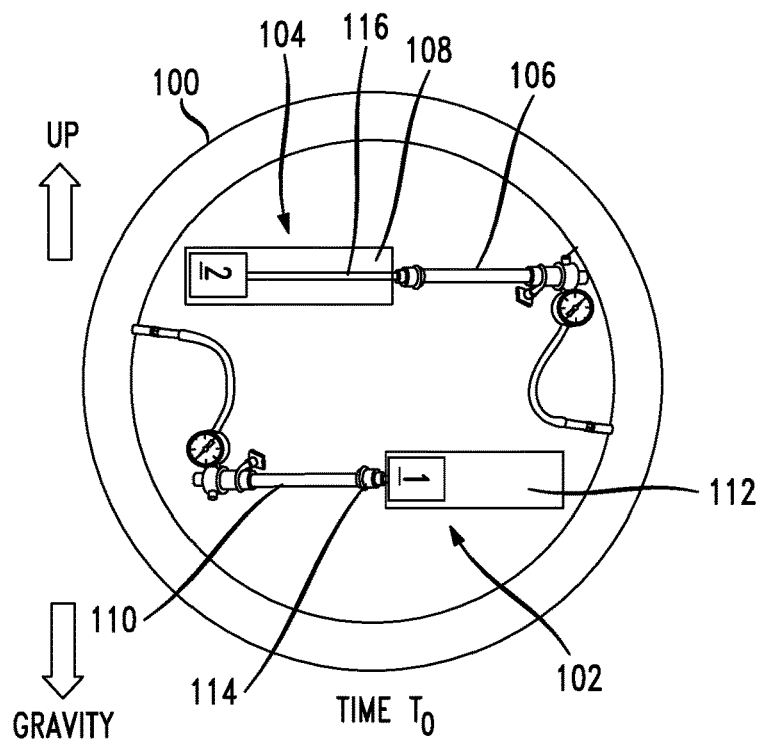
FIG. 2A illustrates the example tire with gravity-driven pumps at time $T_0$.
Figure 2B:
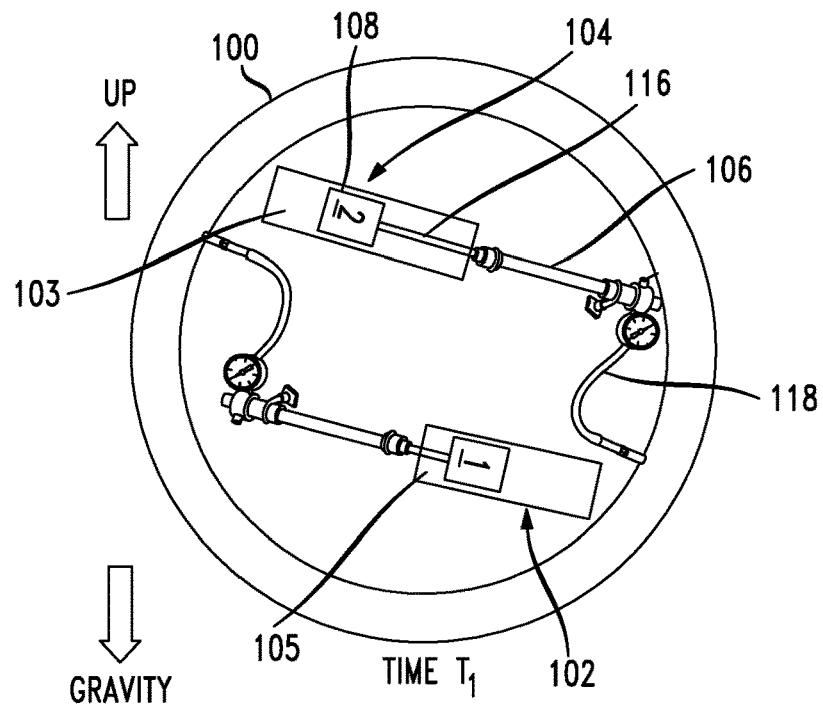
FIG. 2B illustrates the example tire with gravity-driven pumps at time $T_1$.

FIG. 2A illustrates the example tire 100 with gravity-driven pumps 102, 104 at time $T_0$. At this time, both pumps 102, 104 are parallel to the surface of the Earth, and perpendicular to the pull of gravity, so neither pump is affected. The tire rotates in a clockwise direction from time $T_0$ to time $T_1$, as shown in FIG. 2B. FIG. 2B illustrates the example tire 100 with gravity-driven pumps 102, 104 at time $T_1$. The gravity-driven pumps 102, 104 are now slightly off from parallel to the surface of the Earth, so gravity is starting to affect them. The head 1 of pump 102 is being pulled down causing a space 105 to exist in the chamber 108, and causing movement of the pump shaft 116 along the pressure chamber 106. The movement of the pump shaft 116 through the pressure chamber 106 causes air to be pumped through the hose 118 (or other mechanism) into the volume or volumetric container 100, which can be a tire.

Figure 2C:
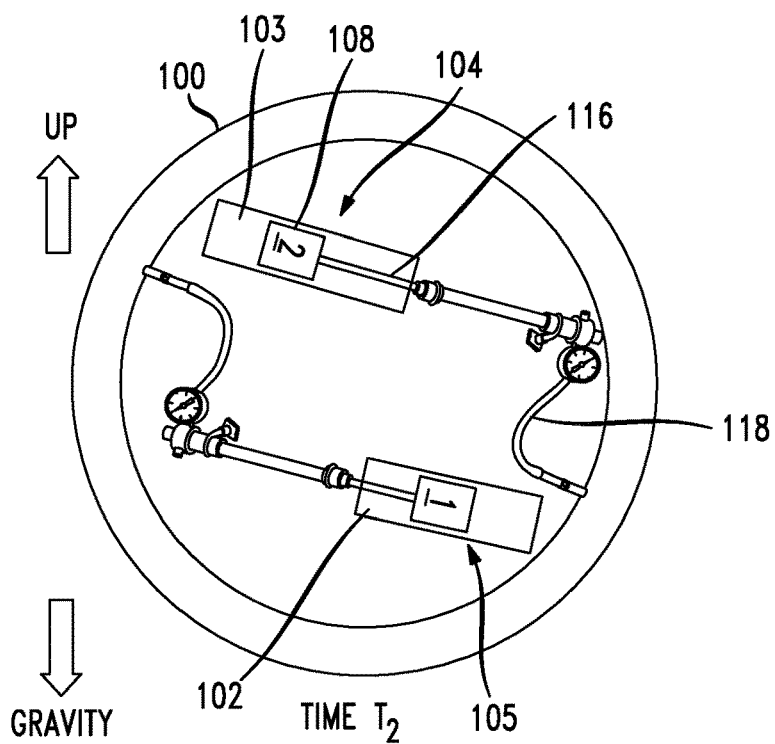
FIG. 2C illustrates the example tire with gravity-driven pumps at time $T_2$.
Figure 2D:
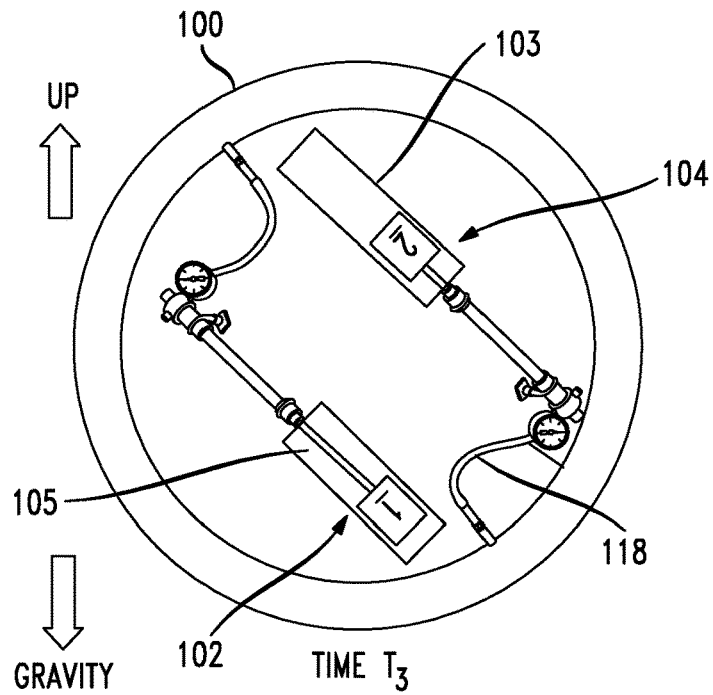
FIG. 2D illustrates the example tire with gravity-driven pumps at time $T_3$.
Figure 2E:
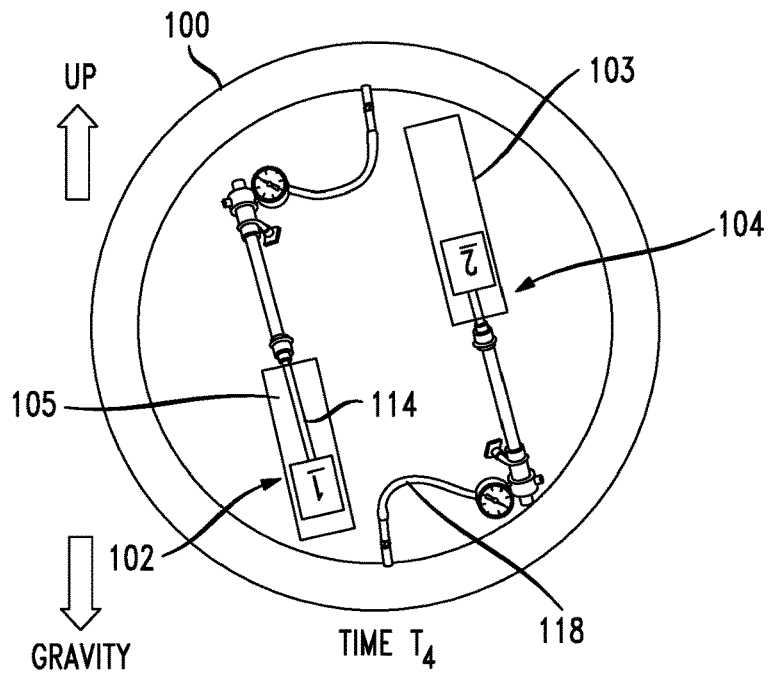
FIG. 2E illustrates the example tire with gravity-driven pumps at time $T_4$.
Figure 2F:
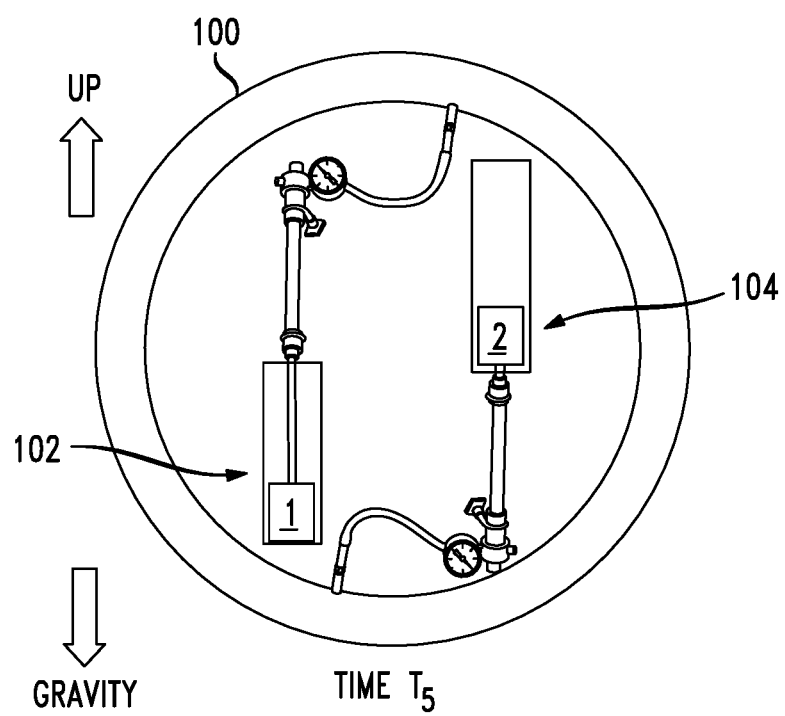
FIG. 2F illustrates the example tire with gravity-driven pumps at time $T_5$.

While pump 108 is starting the pump air into the volume 100, pump 102 in FIG. 2B at time $T_1$ is starting to extract air from the atmosphere into the pump shaft, while pump 104 is starting to compress and inject air from the pump shaft into the volume 100. The tire rotates from time $T_1$ to time $T_2$, as shown in FIG. 2C. FIG. 2C illustrates the example tire 100 with gravity-driven pumps 102, 104 at time $T_2$. The rotation has caused gravity to continue to pull on the pumps at different angles, so the pump stroke in on pump 104 and the pump stroke out on pump 102 continue and may even accelerate. The tire rotates from time $T_2$ to time $T_3$, as shown in FIG. 2D. FIG. 2D illustrates the example tire 100 with gravity-driven pumps 102, 104 at time $T_3$. The tire rotates from time $T_3$ to time $T_4$, as shown in FIG. 2E. FIG. 2E illustrates the example tire 100 with gravity-driven pumps 102, 104 at time $T_4$. The pump strokes are almost complete, as shown by the pump head 2 of pump 104 being almost completely inserted within the chamber 108, while the pump head 1 of pump 102 is almost completely extended from the chamber 112. The tire rotates from time $T_4$ to time $T_5$, as shown in FIG. 2F. FIG. 2F illustrates the example tire 100 with gravity-driven pumps 102, 104 at time $T_5$. At this point, the pump head of pump 102 is completely extended, and the pump head of pump 104 is completely inserted. As the tire continues to rotate in this direction, the roles of the pumps will reverse, so that gravity will cause pump 102 to be inserted and thus pumping air into the tire 100, and cause pump 104 to be extended and thus drawing air into the chamber for pumping. For each complete rotation of the tire at appropriate speeds, based on the tire and pump characteristics, each pump undergoes an insert stroke and an extend stroke.

The example of FIGS. 2A-2F illustrates an example of a tire at a relatively slow speed. Depending on the pump characteristics, a certain speed threshold exists, above which the tire will rotate too quickly to allow the pumps to operate. For example, the changes in orientation due to the rotation of the tire may be too fast to allow the pumps to move. If the pumps are positioned across from each other, the movement of the pumps will cancel each other out so the tire remains harmonically balanced.

Figure 3B:
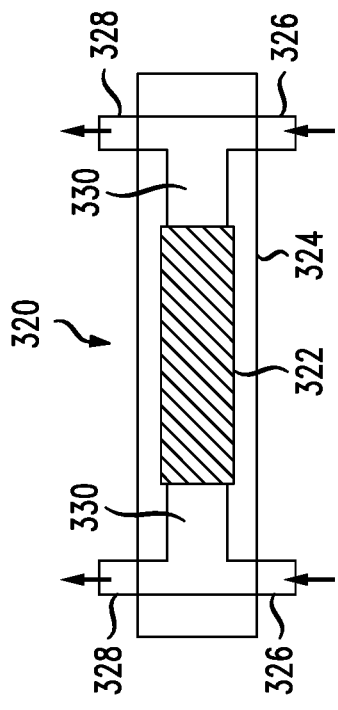
FIG. 3B illustrates an example two-way gravity-driven pump.
Figure 3D:
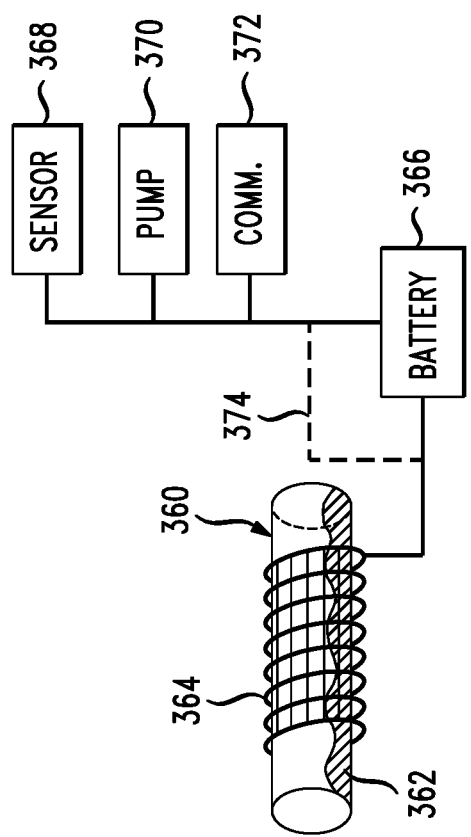
FIG. 3D illustrates an example ferritic fluid gravity-driven electricity generator.
Figure 3A:
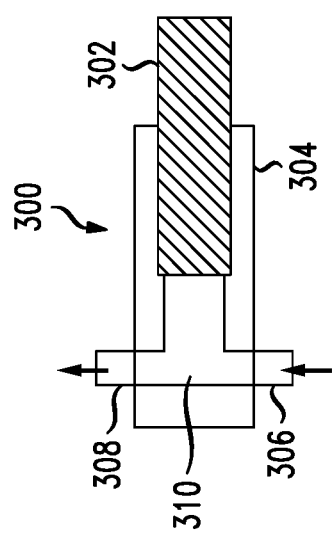
FIG. 3A illustrates an example one-way gravity-driven pump.

FIG. 3A illustrates an example one-way gravity-driven pump 300. The pump 300 includes a mass 302 that moves back and forth partially or entirely within a cylinder 304, to create an interior cavity 310. The interior cavity 310 connects with an intake valve 306 that allows gas into the interior cavity 310 as the mass 302 creates a vacuum by moving away from the interior cavity 310. The interior cavity 310 connects with an outlet valve 308 that allows air to move out of the interior cavity 310 as the mass 302 moves toward the interior cavity 310 and compresses the air therein. The air moving out of the cavity can be pumped into a tire, for example.

FIG. 3B illustrates an example two-way gravity-driven pump 320. This can allow both strokes of the pump 320 to do work. The pump 320 includes a mass 322 that moves back and forth within a cylinder 324, to create two interior cavities 330. Each interior cavity 330 connects with an intake valve 326 that allows gas into a respective interior cavity 330 as the mass 322 creates a vacuum by moving away from one interior cavity to the other. Each interior cavity 330 connects with an outlet valve 328 that allows air to move out of the interior cavity 330 as the mass 322 moves toward that interior cavity 330 and compresses the air therein. The air moving out of the cavity can be pumped into a tire, for example.

Figure 3C:
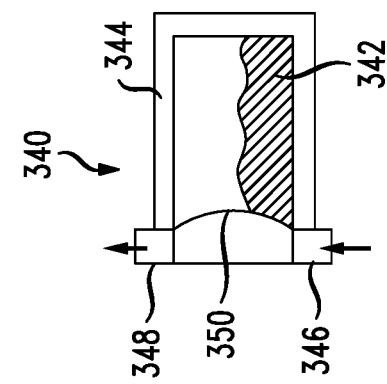
FIG. 3C illustrates an example membrane and fluid based gravity-driven pump.

FIG. 3C illustrates an example membrane and fluid based gravity-driven pump 340. In this example, the mass 342 is a liquid. As gravity acts on the liquid mass 342 in a chamber 344, the mass can press against a membrane 350. The membrane 350 can depress or deform due to the weight of the liquid mass 342, causing air in a cavity behind the membrane 350 to compress and leave through the outlet valve 348. Then, as the liquid mass 342 moves away from the membrane 350, the membrane 350 can return to its original shape, causing a vacuum in the cavity, so air enters via the intake valve 346. The cycles of gravitational pull during rotation of a tire can cause the fluctuations and movement of the liquid mass 342.

FIG. 3D illustrates an example ferritic fluid (Ferrofluid) gravity-driven electricity generator. A tube can contain a semi-viscous fluid (SVF) with magnetic or ferrite particles distributed within the fluid and/or a magneto-rheological fluid. An electrical wire mesh sleeve 364 can surround all or part of the tube 360. The tube is mounted to part of a wheel, such as a rim. As the wheel turns, the SVF within the tube rotates slower than the wheel speed, and the ferrite particles passing through the wire mesh 364 around the tube 360 produce a charge that can be harnessed to do work, such as driving an electrical pneumatic pump. In this example, a cylinder 360 (or other shaped container) contains the ferritic fluid 362 with magnetic particles. A mesh of wires 364 can surround all or part of the cylinder 360. This generator can be affixed to a tire, and, as the tire rotates, the ferritic fluid 362 will move or slosh around inside the cylinder 360. This flow of the ferritic fluid 362 through the mesh 364 causes variations in the magnetic flux that are harnessed to generate electricity in the mesh 364. The electricity can then be directed to a battery, capacitor, or other energy storage device 366, or can power electrical components directly, such as sensors 368, a processor, wireless communications interfaces 372, an electric pump 370, and so forth. The ferritic fluid 362 and mesh 364 can be a curved cylinder that runs along part of a tire rim, or around an entire tire rim, for example.

Figure 3F:
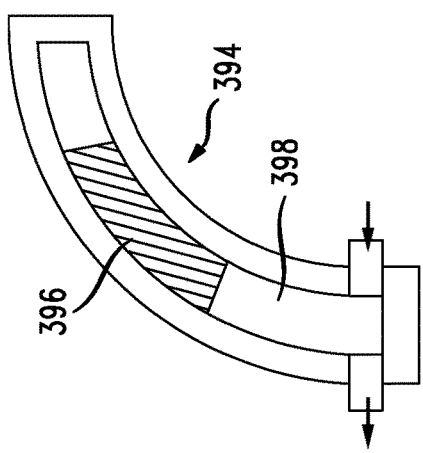
FIG. 3F illustrates an example gravity-driven pump with a curved pump path.
Figure 3E:
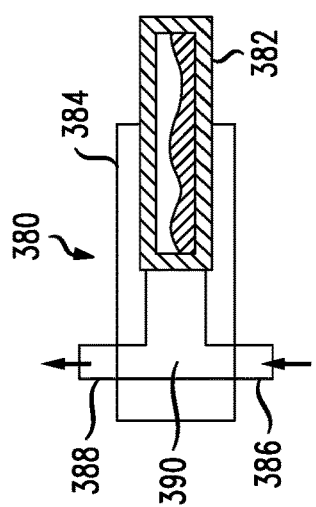
FIG. 3E illustrates a combined gravity-driven pump including internal ferritic fluid.

FIG. 3E illustrates a combined gravity-driven pump including internal ferritic fluid. In this example, as in FIG. 3A, the pump 380 includes a mass 382 that moves back and forth partially or entirely within a cylinder 384, to create an interior cavity 390. The interior cavity 390 connects with an intake valve 386 that allows gas into the interior cavity 390 as the mass 382 creates a vacuum by moving away from the interior cavity 390. The interior cavity 390 connects with an outlet valve 388 that allows air to move out of the interior cavity 390 as the mass 382 moves toward the interior cavity 390 and compresses the air therein. The air moving out of the cavity 390 can be pumped into a tire, for example. However, in FIG. 3E, the mass 382 is hollow and contains a ferritic fluid. As the mass 382 moves and as the tire rotates, the ferritic fluid sloshes around and causes a magnetic flux, which can be harnessed by a mesh of wires (not shown) embedded in the mass 382, in the wall of the cylinder 384, or outside the cylinder 384. Thus, this pump 380 can not only pump air into a tire, but can also simultaneously generate electricity while the tire is moving.

FIG. 3F illustrates an example gravity-driven pump 394 with a curved pump path. In this example, the mass 396 is curved to fit a curved cylinder path 398. The curvature of the pump path can match the rim of a tire, or can have some other curvature. The drop path of the cylinder can be an arc, linear, inverse arc, or can be an arc greater than or less than the arc defined by the radius of the rim. The various examples of pump variations in FIGS. 3A-3F can be combined in various ways not explicitly shown herein. For example, the hollow mass and internal ferritic fluid of FIG. 3E can be combined with the curved pump path of FIG. 3F and the dual cavities of FIG. 3B. As another example, the diaphragm of FIG. 3C can be combined with the ferritic fluid and mesh of FIG. 3D. In each case, the pump operates based on changes in gravity as the pump rotates about an axis, such as a pump affixed to a tire rim that rotates about the tire axle. Changes in gravity cause the mass or the liquid to move back and forth.

Specifically, the energy into the system is provided by the rotation of the wheel or tire, presumably (in the vehicle example) as the vehicle moves from point A to point B. As the wheel rotates, the orientation of the pumping device changes which enables the device to utilize gravity, or the acceleration vector, to do work in different directions. Since changing the gravitational vector is not possible, we change the orientation of the pumping device to facilitate a repeated cycle. In this pneumatic pumping device application, we orient the pump vertically upward, in such a way to use gravity to provide an intake stroke. The pump is then rotated 180°, or vertically down, and gravity is used to provide a compression stroke. This cycle can be repeated indefinitely provided that the wheel continues to rotate.

The placement and the counteracting motions of pumps can provide automatically harmonically balanced tires. At low speeds, the mass may move to do work (thereby pumping air), but at greater speeds the mass may move or may not have a chance or sufficient time to move, so the additional masses from the pumps do not cause an imbalance in the tire.

In each of these examples, the pumps can pump gas, such as air, directly into a tire, or can pump gas into a reservoir or container of compressed air (not shown). For example, if the tire is already inflated to its proper pressure, the pump can fill the reservoir or container to store air under pressure for inflating the tire at a later time, or for some other purpose.

Figure 3G:
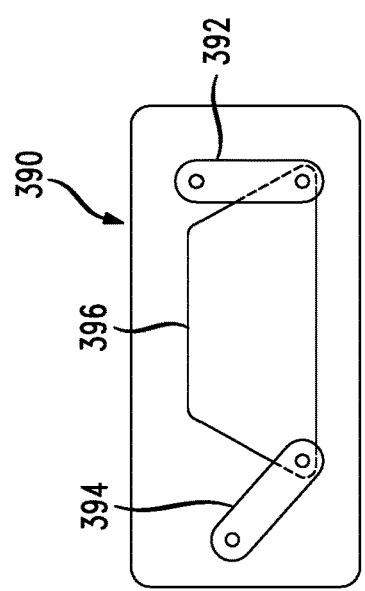
FIG. 3G illustrates different structure for a gravity-driven pump.

FIG. 3G illustrates another structure for a gravity-driven pump. Member 394 and member 392 are both rotatably attached to portions of a fixed surface. The lower portion of these members 392, 394 are each attached to a weight or pump member 396. Just as pump members "1" and "2" of FIGS. 1 and 2A-2F move as the wheel rotates to cause the pumping and intake strokes, the pump member 396 will move as the pump 390 rotates around a wheel. The pump member 396 can be attached to a piston, shaft or other member such that as the member 396 moves from one position to the other due to gravity, pumping and intake strokes occur. FIG. 3G illustrates that alternate pump structures can be used in connection with a wheel and volumetric container for air to maintain a certain pressure in the container.

Figure 4:
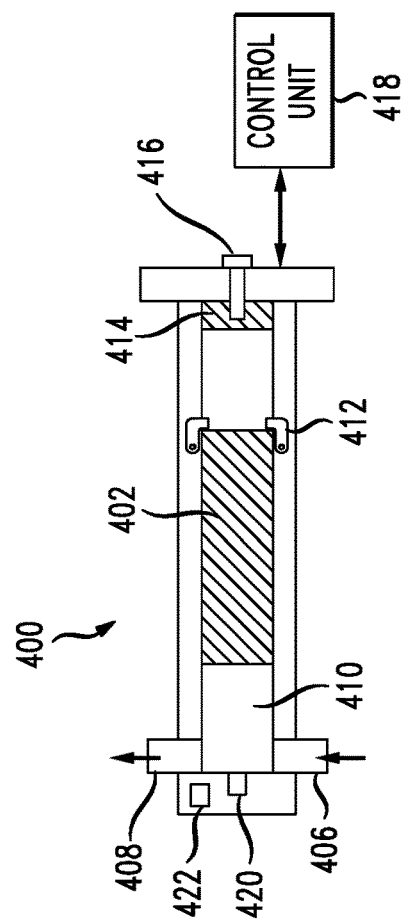
FIG. 4 illustrates an example gravity-driven pump with adjustable parameters and sensors.

FIG. 4 illustrates an example gravity-driven pump 400 with adjustable parameters and sensors. The pump 400 includes a mass 402 that moves back and forth partially or entirely within a cylinder, to create an interior cavity 410. The interior cavity 410 connects with an intake valve 406 that allows gas into the interior cavity 410 as the mass 402 creates a vacuum by moving away from the interior cavity 410. The interior cavity 410 connects with an outlet valve 408 that allows air to move out of the interior cavity 410 as the mass 402 moves toward the interior cavity 410 and compresses the air therein. The air moving out of the cavity can be pumped into a tire, for example, as in FIG. 3A. The mass 402 can typically move freely for the entire length of the cylinder, to create a long stroke. However, under certain tire rotation, driving, or road conditions, a stroke of a different length may be optimal. This example pump 400 includes latches 412 which can be operated via a control unit 418 to engage or disengage to modify the stroke length of the mass 402. For example, when latches 412 are engaged, the stroke length is shorter, and when latches 412 are disengaged, the stroke length is longer. A series of latches or a dynamically adjustable latching mechanism can provide finer control over a precise stroke length. Sensors in the tire and/or tire stems can provide alerts when the maximum safe pressure is exceeded, when pressure is too low, provide an estimate of when the tire will be undriveable based on the current conditions, and/or the efficiency of the pump. The control unit 418 can communicate with these and other sensors, computing devices, databases, or other components to determine a desired stroke length for the driving conditions and for an associated tire, in order to adjust these pump parameters.

The control unit 418 can adjust other pump parameters as well. For example, the control unit 418 can operate a release mechanism 416 that can release an additional mass 414. The additional mass 414 can attach to mass 402 for a combined larger mass and different pump characteristics. The larger combined mass of the mass 402 and the additional mass 414 may provide more optimal pumping at higher speeds, for example. The release mechanism can recapture and hold in place the additional mass 414 when the control unit 418 determines that the additional mass 414 is not needed. In another variation, the release mechanism 416 can interface directly with the mass 402 and can hold the mass 402 in place when pumping is not necessary, and can release the mass 402 to do pumping work when pumping is desired. In this way, the release mechanism can fix the mass in place if no more pumping is needed to reduce wear. Similarly, a TPMS (Tire-Pressure Monitoring System) can encounter power limitations. For example, the power density can be insufficient to provide accurate tire pressure readings for a desired length of time (for example, 1 year versus a desired 4 years of power). The pumping mechanism can be used to augment the existing power source and/or provide a power source to charge the TPMS power supply when not being used to move air.

The pump 400 can include various sensors, such as an internal sensor 420 and an external sensor 422. The control unit 418 can interface with each of these sensors 420, 422. The internal sensor 420 can detect attributes of the gas in the internal cavity 410. For example, the internal sensor 420 can detect pressure, speed of the air moving in or out of the internal cavity, air temperature, air composition, humidity, pH levels, salinity, air quality, air cleanliness, and so forth. The external sensor 422 can detect similar attributes for external conditions. The internal sensor 420 and/or the external sensor 422 can relay those readings to the control unit 418, which can then base decisions and execute actions based on those readings. For example, if the internal sensor 420 reports air cleanliness that the control unit 418 determines is too low, the control unit 418 can control the outlet valve 408 to shunt the pumped air out back into the atmosphere instead of into the tire or into an air reservoir or tank. Similarly, if the external sensor 422 reports air salinity that the control unit 418 determines is too high and may lead to corrosion damage to the pump or to the tire, the control unit 418 can control the intake valve 406 to prevent air from entering the internal cavity 410. The control unit 418 can further interface with sensors in the tire to determine a type of gas in the tire. For example, the tire may be inflated with normal air, nitrogen, a different gas, or a mixture thereof. Sensors within the tire and/or tire stem can detect the chemical makeup of gas within the tire, pH of the air (as a rust indicator/salinity predictor), tire pressure, internal/external temperatures, internal/external humidity, side wall deformation, estimated load as a function of side wall deformation, tire age/year of construction, estimated wear based on driving usage/type/age, and tire type. Sensors can also work in conjunction with the pump to record history/ statistics/analytics of performance and efficiency of the pump (such as how much air the pump has pumped over its lifetime, how many strokes it has averaged per day or per trip, etc.). Using data from the sensors, the control unit 418 can decide, based on how urgently the tire needs to be inflated and based on the type of gas in the tire already, whether to activate the pump to pump additional air into the tire. In one variation, the control unit 418 can even control the intake valve and outlet valve 408 to reverse their directions so that the pump can actively extract excess pressure from the tire in over-inflation conditions. For example, if the tire is inflated to a desired pressure range at a cold temperature, as the tire moves and heats up, the pressure increases. If the pressure increases, due to temperature or other causes, and thereby exceeds a desired range or threshold, the control unit 418 can actively pump air out of the tire until the pressure reaches the desired range or threshold.

Figure 5:
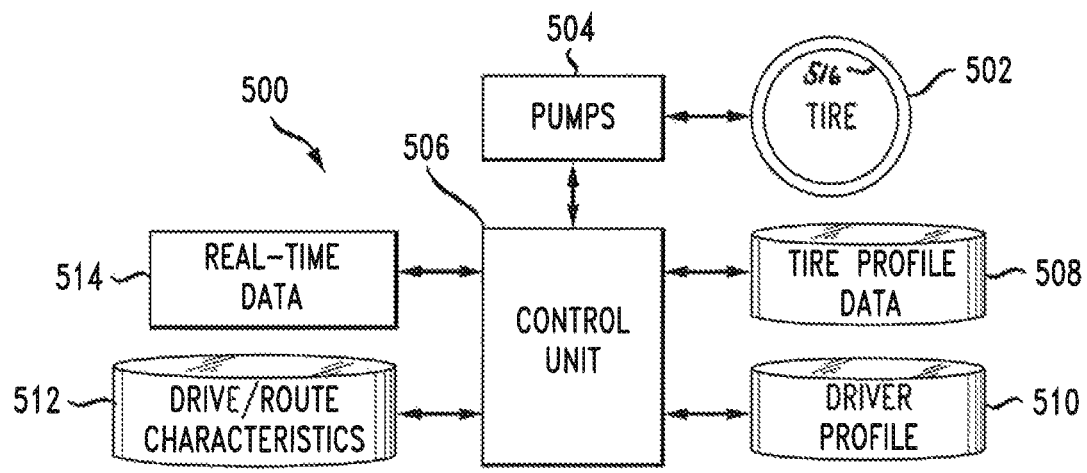
FIG. 5 illustrates example control unit communications with a gravity-driven pump.

FIG. 5 illustrates example communications of the control unit 506 with gravity-driven pumps 504 as well as with other components. The control unit 506 can communicate with multiple different components via wired or wireless communications, or the control unit 506 can integrate all or part of these components in to itself. As discussed above, the control unit 506 can communicate with pumps 504 to control various pump characteristics, as well as to gather analytics data about how air loss is occurring (i.e., examine air loss characteristics of a tire, the driving patterns, actual and/or expected ambient conditions, to determine average air loss for a given tire), how the pump is performing, including a number of pump strokes, how often and when the pump strokes occur (i.e., how many pump strokes are needed for a given pump type to maintain a desired pressure based on average air loss for a specific tire or a general tire), how much air is pumped total, and so forth. The control unit 506 can receive real-time data 514 from sensors that monitor the pump, the tire, or other data sources related to the tire or the pump performance. One example of a source of real-time data is a sidewall deformation sensor that provides data from which a load on the tire can be extrapolated or calculated. The control unit 506 can also examine driver and route characteristics 512 to determine how to control the pump, or to report how patterns of driving or which routes influence pump performance. For example, if the control unit 506 is associated with a truck for a bottled water distributor, the characteristics of the route are very different at the beginning of the day when the truck is under full load, as opposed to the drive back to the warehouse when the truck is empty or mostly empty. Likewise, the patterns can be associated with categories, such as city driving, stop and go, highway driving, a delivery driver, etc. The driving patterns can be defined by information such as maximum/minimum speed, how often the driver stops, acceleration/braking, cruise control use, camber of roads within the pattern, driving durations, etc. The control unit 506 can modify the pumps' behavior accordingly so the tires 502 remain inflated within the desired range. For example, the control unit 506 can overlay the type of route and personal driving patterns of the driver to automatically adjust the pump performance. The pump 504 can be configured also on an interior radial portion 516 of the tire 502.

The control unit 506 can identify, from a tire profile database 508, a tire type for the tire 502. The tire type can indicate how fast gas leaks from the tire due to natural porosity of the tire, a range of optimal inflation for that tire type, how temperature affects the tire, how different loads affect the tire, and so forth. The tire profile database 508 can also store data indicating how various tire attributes change over time as the tire ages and/or wears. The control unit 506 can monitor and build up a driver profile 510 or simply use an existing driver profile 510. The driver profile 510 can track driving patterns of an individual user or group of users. The driver profile 510 can include information such as how quickly the driver tends to accelerate from a stopped position, braking times, turn sharpness, and so forth. Each driver drives slightly differently, and the control unit 506 can use that data to determine how or whether to modify pump attributes 504 based on the tire profile data 508 to ensure that the tire 502 remains inflated within the appropriate pressure range. For example, when the driver arrives at the vehicle, the driver's phone can sync with the control unit 506, providing the driver's identity to the control unit 506. The control unit 506 can then use the driver's profile to determine the appropriate pressure range for the tires.

The control unit 506 can communicate with a pressure release valve for the tire which can either relieve pressure from within the tire 502 or can prevent unneeded pump strokes from pumping air into the tire 502, such as by pumping air back into the atmosphere, a separate air container, or elsewhere. The control unit 506 can examine real-time data 514 such as tire pressure and activate all of the pumps 504 for the tire 502 if a sudden pressure drop is detected, for example. If the pumps 504 have been pumping air into a reservoir, the control unit 506 can cause that air to be released into the tire 502 as well. Alternatively, the control unit 506 can only activate specific times and/or when specific conditions have been met. For example, the control unit 506 can be configured to check tire pressure and/or release air pressure into the tire every hour, every five minutes, only when certain conditions are met (i.e., low pressure detected, low temperatures), combinations of conditions are met (i.e., low pressure+sidewall damage), etc.

In one scenario, the optimum or preferred pressure for a given tire under a certain load are "x". If the load of the vehicle were to change (increase or decrease), the preferred pressure would also change to address the different load. The pressure might also need to be changed based on weather conditions, temperature, terrain (paved road versus dirt road), and any other parameter like speed, geography, regulations, etc. Normally, when the tire pressure is insufficient for a given load the side walls of the tire begin to bulge and the tire footprint increases to carry the load. This can include more than the tread, sidewalls, etc., to satisfy the pressure requirement based on force over area. A sensor, such as a piezo-electric strain sensor, in a side wall that can provide data related to distortion of the side wall. The sensor can be aware of the type of tire and a maximum/minimum safe pressure, and can have its own electricity generator based on a gravity principle. Such data would be an indirect measure of the tire pressure related to the load. If the side walls bulge for a given load, the pressure is likely insufficient for that load and should be increased. However, there is a maximum pressure for each tire which should not be exceeded. Sensors and/or pumps could provide or transmit data to a device, such as a vehicle display or a portable device, for notifying a driver of the pressure issue.

Other data that can be relevant for adjusting the pressure includes receiving operating information from the sidewall, strain gauge deformation, temperature, humidity, PH (Acidity/alkalinity data), oxidation/rust information, air composition, and so forth. Any one or more of these items can be captured and used as a basis for change the tie pressure accordingly. The system may also include accessing the TPMS system for an independent pressure reading and tire location. For example, the front steering tires perhaps should be at a different pressure than rear tires.

The pressure may need to be decreased as well. The system can divert excess pressure from the tire when the tire is at an acceptable pressure or can continue pumping regardless of pressure and use a pressure relief valve to keep the intravolumetric pressure at a prescribed target pressure. This approach would be similar to a voltage divider or a water heater pressure relief valve.

Figure 6:
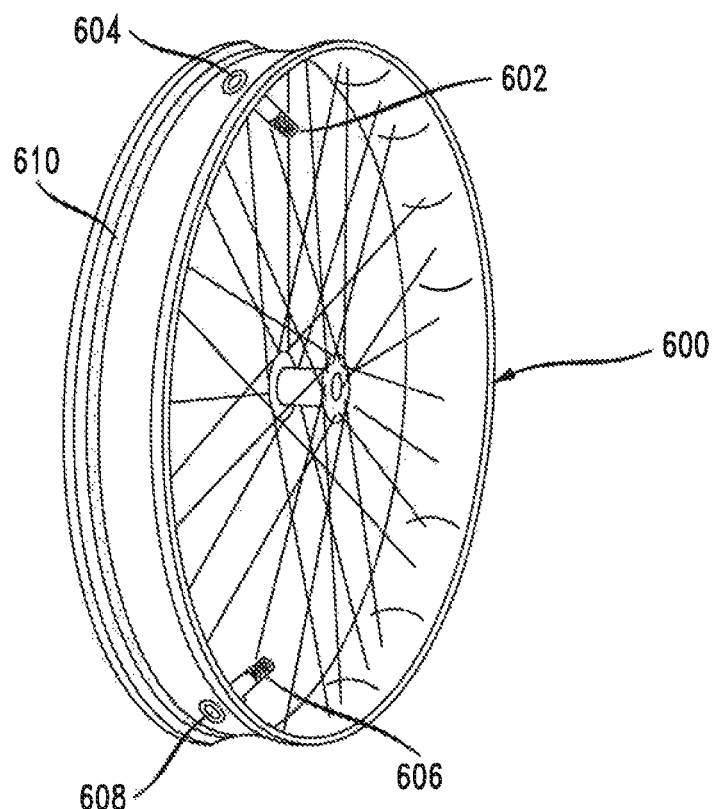
FIG. 6 illustrates an example modified tire rim for receiving gravity-driven pumps.

FIG. 6 illustrates an example modified tire rim 600 for receiving gravity-driven pumps. Rim designs can be modified from the standard approach by including more than one hole for air access. Further, rims can be modified to include a mounting channel to minimize damage to the pumping mechanism when mounting or repairing a tire. In this example, the tire rim 600 is a bicycle rim, but the same principles apply to virtually any inflatable tire, such as tires for consumer cars, busses, heavy construction or mining equipment, motorcycles, scooters, golf carts, and other electric, human-powered, or other-powered vehicles (gasoline, diesel, electric, fuel cell, etc.). These principles can be applied to any rotational motion to which a pump can be affixed to pump air and/or to generate electricity. The tire rim 600 can be modified with multiple stems 602, 606 and corresponding holes 604, 608 in the rim to accommodate pumps. Gravity-driven pumps can be mounted on the interior surface of the rim 600 (or externally) and can be incorporated into or with stems 602, 606 so that a user can inflate the tire in the normal way. In another embodiment, the rim 600 has a channel 610 into which pumps can be inserted. The channel 610 must have holes for the pump to pump in external air, or some other alternate air input.

Figure 7:
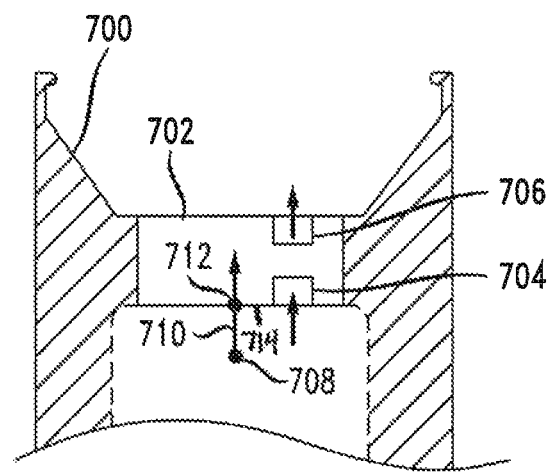
FIG. 7 illustrates an embedded gravity-driven pump in a modified tire rim.

FIG. 7 illustrates an embedded gravity-driven pump 702 in a modified tire rim 700 with a channel 610. In this example, the pump 702 occupies an entire portion of the rim 700, essentially becoming part of the exterior and interior surface of the rim 700, however the pump 702 can alternatively snap into a receiving receptacle that forms all or part of the interior and/or external surface of the rim 700. The air intake valve 704 pulls air in from the atmosphere and the pump pumps air into the tire through the outlet valve 706. In one embodiment, the channel 610 incorporates separate holes for each pump, but in another embodiment, the channel 610 includes a pneumatic system so that multiple pumps work together and feed in to a combined location for pumping air into the tire. A pump can be configured or attached on an interior radial surface portion 714 of the tire rim 700.

The pumping mechanism can include some kind of visual indication, such as a sticker (such as a state inspection sticker), different color or color pattern, notches, a light, etc., to indicate readily and easily that automatic gravity-driven pumps are included on this rim, or that the rim is capable of receiving and operating with such pumps. The indications can be more detailed visual markings as well, such as text, symbols, or other markings on the tire. The indications can include non-visual components, such as a different texture or material, a vibration generating motor, an audible alert, NFC or RFID tags that electronically and wirelessly confirm the presence of gravity-driven pumps, or that confirm that the tire is capable of receiving and operating with such pumps. These notifications can, where capable, further provide an indication that the pump is functional, such as illuminating a green LED to indicate proper operation, and illuminating a red LED to indicate a failure of some kind. Different blinking patterns can communicate different states of functionality or detected problems. An NFC or RFID tag can communicate additional status or diagnostic information for a pump which can be displayed on a mobile device, such as a tablet or smartphone. Further, the rim and/or the pump mechanism can include markings, notches, bumps, etc. that confirm or guide proper pump mechanism placement, alignment, and/or orientation. Such guides can help reduce the potential to damage the pump or the rim during mounting or repairing procedures.

The rim 600 can be modified to receive a "replacement" pumping mechanism, such as if one pump is damaged or not functioning properly. The pumping mechanism can be popped out, either manually or with a general-purpose tool or a specific tool for removing pumps. Then a user can replace the removed pump with a new pump. The pumping mechanism can be internally mounted, i.e., can be mounted on the outside of the rim facing into the interior of a tire. The pumping mechanism can similarly be externally mounted, i.e., mounted on the inside of the rim facing toward a center of the rim. The pumping mechanisms can be mounted onto the rim at multiple locations which may be different from the locations of any stems for manual inflation. The stem and/or pumping mechanism can exhaust pumped air according to a variable target pressure based on load, as indicated by data from a tire sidewall deformation sensor. The valve and/or stem can act as a Schrader valve, drawing/exhausting air above/below a target pressure.

Figure 8:
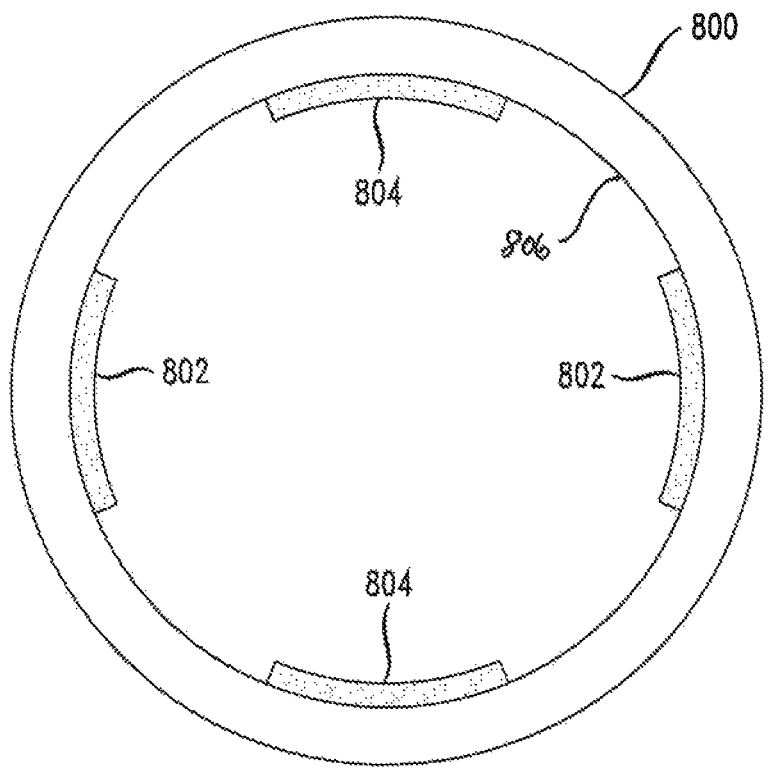
FIG. 8 illustrates an example placement of a heterogeneous gravity-driven pumps on a tire.

FIG. 8 illustrates an example placement of heterogeneous gravity-driven pumps 802, 804 on a tire 800. Different pumps can have different pumping attributes with "sweet spots" tuned to exploit changes in gravity better at different speeds, or under different operating conditions. The different pumps can be placed in such a way that the tire remains harmonically balanced. In FIG. 8, pumps of a same type (for example just pumps 802 or just pumps 804) are placed directly opposite each other, because pumps of different types may have different weights or the masses may move in different patterns. However, as long as pumps of the same type are evenly distributed or spaced around the tire, the harmonic balance can be maintained. In other words, the pumps should have an equal angular distance between them. For example, three pumps of a same type can be distributed 120 degrees apart from one another. The control unit can communicate with the different types of pumps, and can activate all pumps collectively, or can activate all pumps of a same type. For example, a single tire can have multiple sets of different pumps to exploit different driving patterns—such as a set of short pumps at clock positions 12 o'clock and 6 o'clock, and a set of long pumps at clock positions 3 o'clock and 9 o'clock. Different patterns, types, sets, or numbers of pumps can be designed and implemented to have different thresholds/"sweet spots" which exploit different conditions and/or driving patterns. Other modules can introduce weight at different locations on the tire, which can be offset by placing the pumps in different locations. For example, the pumps can be placed at uneven angular distances from each other to accommodate additional weight from sensors, electronics, tire stems, etc. The tire 800 can have a pump or pumps 802/804 attached to an interior radial portion 806 of the tire 800.

In one variation, the control unit can determine that only a small amount of pumping is needed, such as the amount provided by a single pump. But in order to maintain the harmonic balancing due to the moving masses in the pumps, the control unit can activate all of the pumps of a same type, while enabling one pump to pump air into the tire while the remaining pumps simply pump air back into the atmosphere. In this way, the movement of the masses in the pumps offset each other for harmonic balancing, but only one pump is 'working'. In case of pump removal, a specially shaped plug can be inserted into the hole from which the pump was removed to cover the holes and protect the tire, rim, and the hole.

Figure 9:
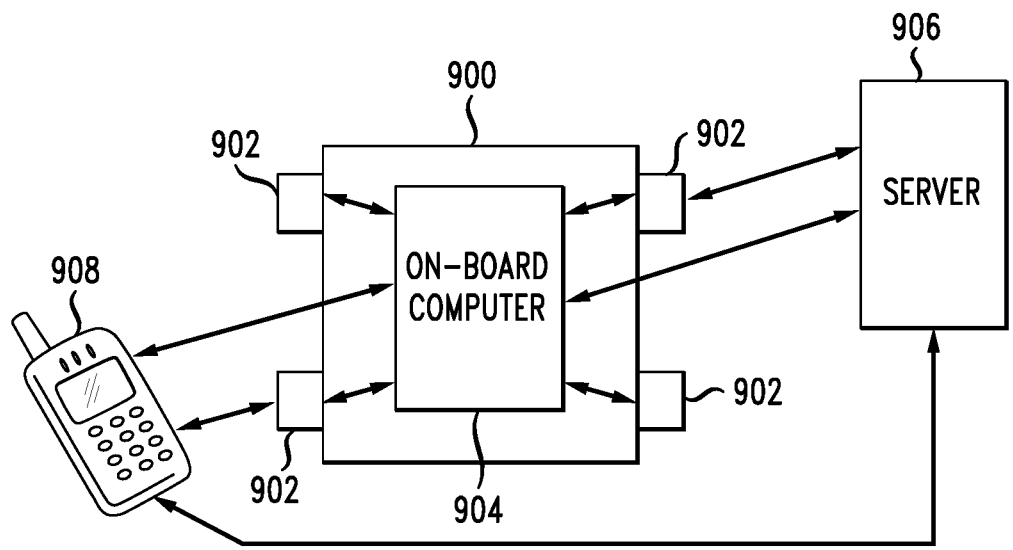
FIG. 9 illustrates an example communication network for gravity-driven pumps with other devices.

FIG. 9 illustrates an example communication network for gravity-driven pumps 902 with other devices. The communication network can be wired, wireless, or a combination thereof. Some parts of the communication network may be active at different times. The pumps 902 can communicate with an on-board computer 904 for a vehicle 900. The on-board computer 904 can serve as a control unit, or can interface with individual control units for each pump 902. The pumps 902 and/or the on-board computer 904 can communicate with a server 906 to report analytics or performance data for the pumps, the tires, for fuel efficiency, and so forth. The server 906 can then provide a web or other interface for users to view the reported data, and/or manage pumps in the vehicle. Similarly, the pumps 902 and/or the on-board computer 904 can communicate with a mobile device 908 such as a tablet, smartphone, or diagnostic tool.

The mobile device 908 can communicate with the pumps 902 and/or the on-board computer 904 via a wired or wireless connection. One example of a wired connection is an OBD-II wired connection. Some examples of wireless connections can include Bluetooth™, Zigbee™, Wi-Fi™, WIMAX™, or RFID. Any of these connections can be bi-directional or uni-directional.

The pump mechanisms can incorporate electronic components to read and transmit wirelessly various data including tire pressure, tire temperature, internal and external air temperature, humidity, side wall deformation, estimated load as a function of pressure and side wall deformation, pH reading as indicator of oxidation (rusting) inside the tire, air quality sensors, barometric pressure, an amount of electricity generated, an amount of air pumped into the tire, and so forth.

In one embodiment for a semi truck, as the semi-truck pulls in to a weigh station, devices or sensors embedded or placed in positions throughout a parking zone can communicate with the individual pumps in the tires and provide a report to an inspector. The report can show, for example, green check marks for tires and pumps functioning properly, and red X's or yellow exclamation marks for tires or pumps that need inspection. The report can provide access for a user to drill down to more detailed information. For example, a user can examine the report to view a history of pump operation, and a chart showing the tire pressure over time to verify that the pump is maintaining the tire pressure within a desired range. This can save significant time and cost at inspections. Such sensors can be placed in other locations as well, or the on-board computer 904 can generate such reports and transmit them to the server 906.

The pumps 902 and on-board computer 904 can be integrated with, or communicate via, the CAN bus or using a CAN protocol. For example, the pumps 902 and on-board computer 904 can communicate with "wireless inspection stations" for vehicle inspections, such as semi trucks at weigh stations, at vehicle service centers, or at government agencies such as the division of motor vehicles for inspections.

Figure 10:
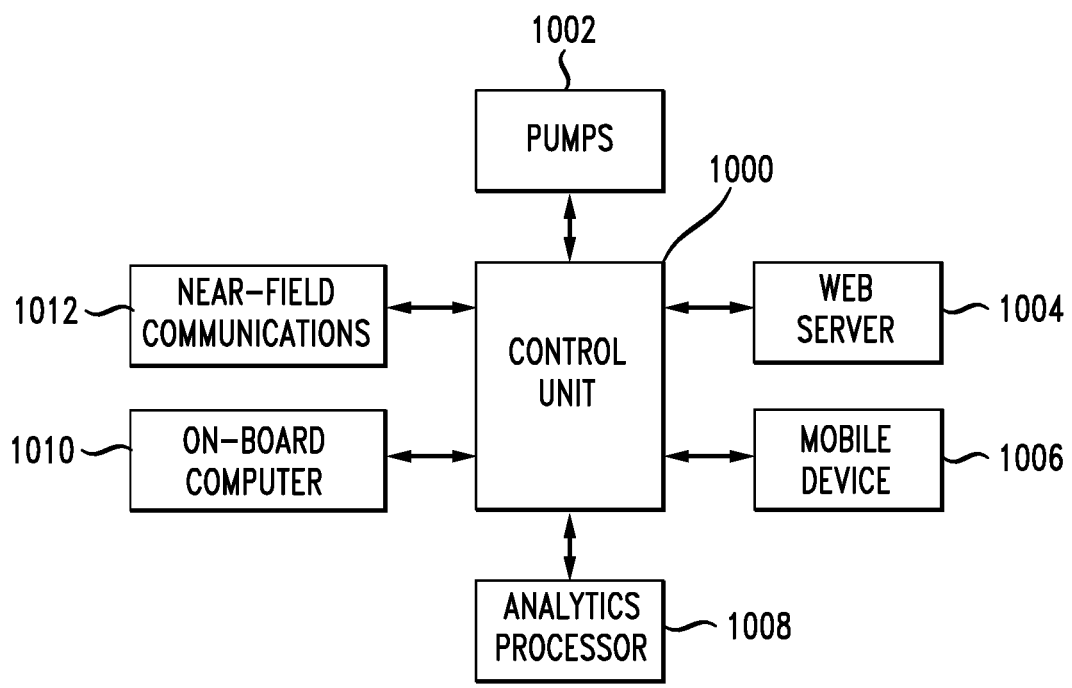
FIG. 10 illustrates example control unit communications with external devices.

FIG. 10 illustrates example control unit 1000 communications with external devices, in a more detailed view of FIG. 9. The control unit 1000 communicates with the pumps 1002, a web server 1004, a mobile device 1006, via a near-field communications (NFC) interface, or with an on-board computer 1010. The control unit 1000 can also communicate with an analytics processor 1008 for determining the appropriate inflation ranges for tires.

Figure 11:
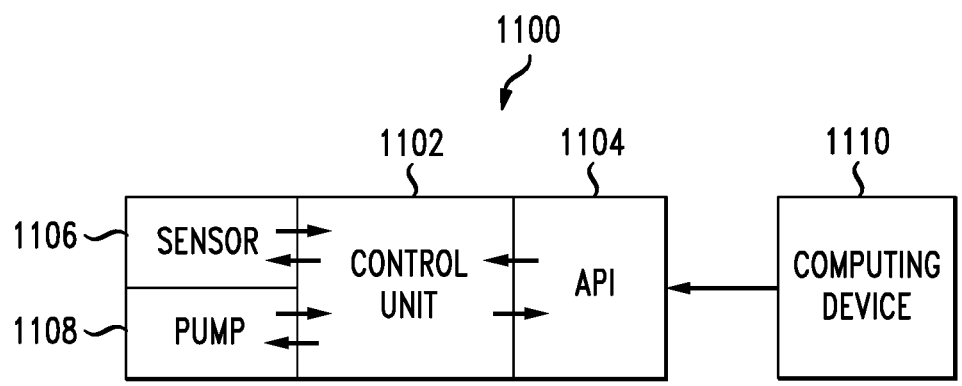
FIG. 11 illustrates an application programming interface (API) for accessing the control unit.

FIG. 11 illustrates 1100 an application programming interface (API) 1104 for accessing the control unit 1102. A computing device 1110 accesses the control unit 1102 via an API 1104. The API 1104 can also expose functionality from a sensor 1106 and a pump 1108. The API 1104 can provide a standardized, abstracted way for a computing device to obtain data from or send instructions to any of the underlying components without knowledge or details of how those underlying components operate. For example, the API can define how the computing device 1110 requests a current state of the pump 1108. When the computing device 1110 requests that current state via the API 1104, from the computing device's perspective, inputs are provided, and a corresponding output is returned. The API can be standard regardless of the underlying types of control units 1108, sensors 1106, or pumps 1108. In this way, virtually any computing device 1110 of any type can communicate with and control these components via the API 1104.

Figure 12:
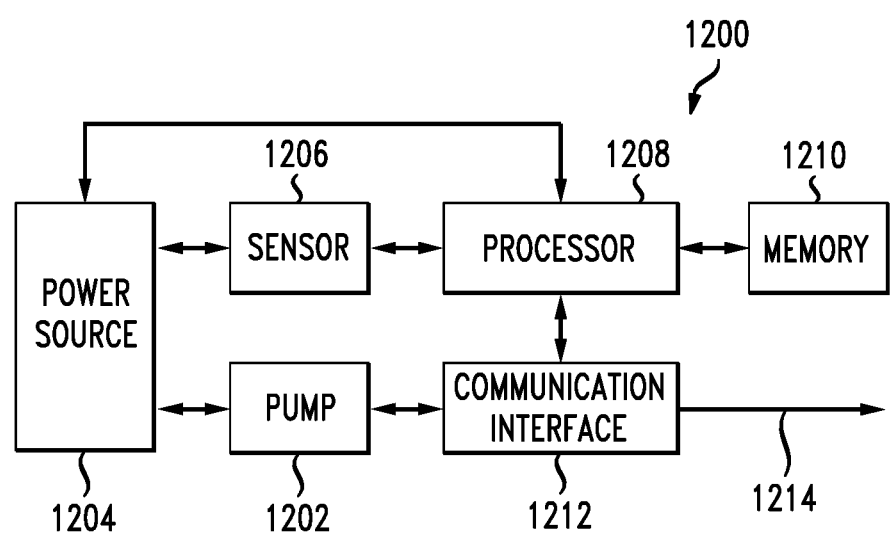
FIG. 12 illustrates an example computing device for controlling and monitoring a gravity-driven pump.

FIG. 12 illustrates an example computing device 1200 for controlling and monitoring a gravity-driven pump 1202. In this example, the pump 1202 can provide power to recharge a power source 1204 such as a capacitor or battery. Alternatively, the power source can be a type of battery or other energy storage device that does not need power from the pump 1202. The power source 1204 can power a sensor 1206, a processor 1208, and a memory 1210. The pump 1202 and the processor 1208 can communicate via a communication interface 1212, and the processor can also communicate with external devices 1214 via the communication interface 1212.

Figure 13:
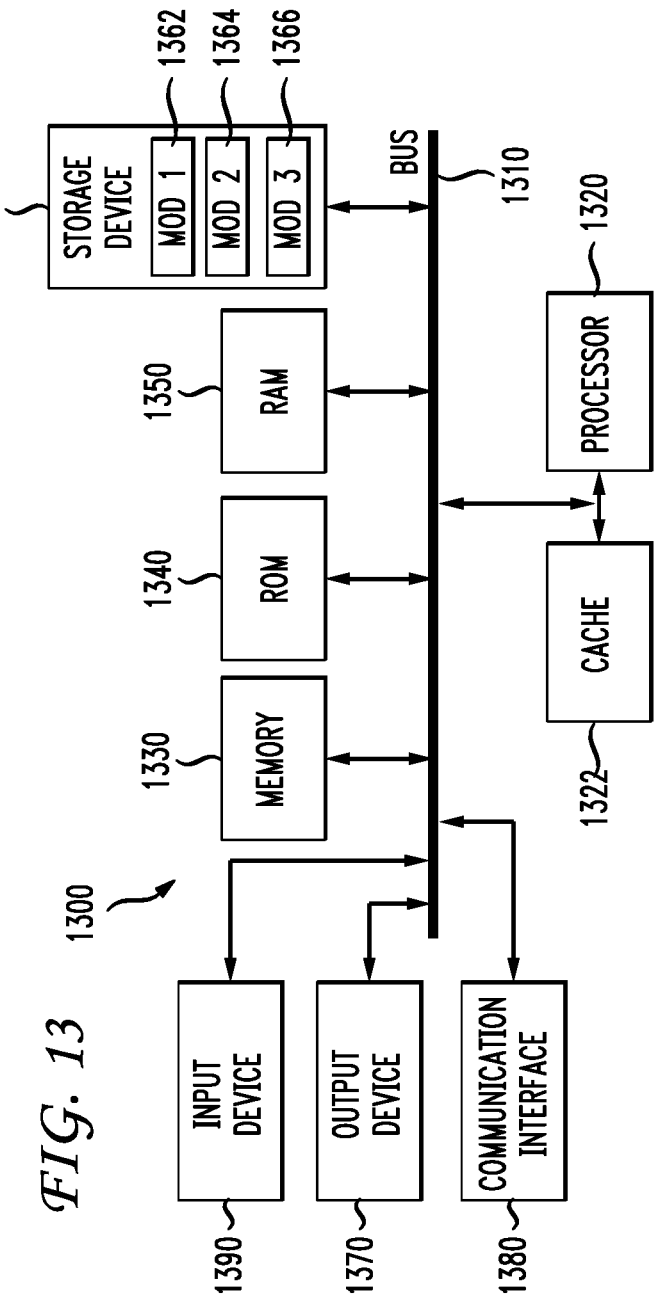
FIG. 13 illustrates an example system embodiment.

A brief description of a basic general purpose system or computing device in FIG. 13 which can be employed to practice the concepts is disclosed herein. With reference to FIG. 13, an exemplary system 1300 includes a general-purpose computing device 1300, including a processing unit (CPU or processor) 1320 and a system bus 1310 that couples various system components including the system memory 1330 such as read only memory (ROM) 1340 and random access memory (RAM) 1350 to the processor 1320. The system 1300 can include a cache 1322 of high speed memory connected directly with, in close proximity to, or integrated as part of the processor 1320. The system 1300 copies data from the memory 1330 and/or the storage device 1360 to the cache 1322 for quick access by the processor 1320. In this way, the cache provides a performance boost that avoids processor 1320 delays while waiting for data. These and other modules can control or be configured to control the processor 1320 to perform various actions. Other system memory 1330 may be available for use as well. The memory 1330 can include multiple different types of memory with different performance characteristics. It can be appreciated that the disclosure may operate on a computing device 1300 with more than one processor 1320 or on a group or cluster of computing devices networked together to provide greater processing capability. The processor 1320 can include any general purpose processor and a hardware module or software module, such as module 13 1362, module 2 1364, and module 3 1366 stored in storage device 1360, configured to control the processor 1320 as well as a special-purpose processor where software instructions are incorporated into the actual processor design. The processor 1320 may essentially be a completely self-contained computing system, containing multiple cores or processors, a bus, memory controller, cache, etc. A multi-core processor may be symmetric or asymmetric.

The system bus 1310 may be any of several types of bus structures including a memory bus or memory controller, a peripheral bus, and a local bus using any of a variety of bus architectures. A basic input/output (BIOS) stored in ROM 1340 or the like, may provide the basic routine that helps to transfer information between elements within the computing device 1300, such as during start-up. The computing device 1300 further includes storage devices 1360 such as a hard disk drive, a magnetic disk drive, an optical disk drive, tape drive or the like. The storage device 1360 can include software modules 1362, 1364, 1366 for controlling the processor 1320. Other hardware or software modules are contemplated. The storage device 1360 is connected to the system bus 1310 by a drive interface. The drives and the associated computer-readable storage media provide non-volatile storage of computer-readable instructions, data structures, program modules and other data for the computing device 1300. In one aspect, a hardware module that performs a particular function includes the software component stored in a tangible computer-readable storage medium in connection with the necessary hardware components, such as the processor 1320, bus 1310, display 1370, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 1300 is a small, handheld computing device, a desktop computer, or a computer server.

Although the exemplary embodiment described herein employs the hard disk 1360, other types of computer-readable media which can store data that are accessible by a computer, such as magnetic cassettes, flash memory cards, digital versatile disks, cartridges, random access memories (RAMs) 1350, read only memory (ROM) 1340, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 1300, an input device 1390 represents any number of input mechanisms, such as a microphone for speech, a touch-sensitive screen for gesture or graphical input, keyboard, mouse, motion input, speech and so forth. An output device 1370 can also be one or more of a number of output mechanisms known to those of skill in the art. In some instances, multimodal systems enable a user to provide multiple types of input to communicate with the computing device 1300. The communications interface 1380 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 1320. The functions these blocks represent may be provided through the use of either shared or dedicated hardware, including, but not limited to, hardware capable of executing software and hardware, such as a processor 1320, that is purpose-built to operate as an equivalent to software executing on a general purpose processor. For example the functions of one or more processors presented in FIG. 13 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 1340 for storing software performing the operations described below, and random access memory (RAM) 1350 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 1300 shown in FIG. 13 can practice all or part of the recited methods, can be a part of the recited systems, and/or can operate according to instructions in the recited tangible computer-readable storage media. Such logical operations can be implemented as modules configured to control the processor 1320 to perform particular functions according to the programming of the module. For example, FIG. 13 illustrates three modules Mod1 1362, Mod2 1364 and Mod3 1366 which are modules configured to control the processor 1320. These modules may be stored on the storage device 1360 and loaded into RAM 1350 or memory 1330 at runtime or may be stored in other computer-readable memory locations.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Figure 14:
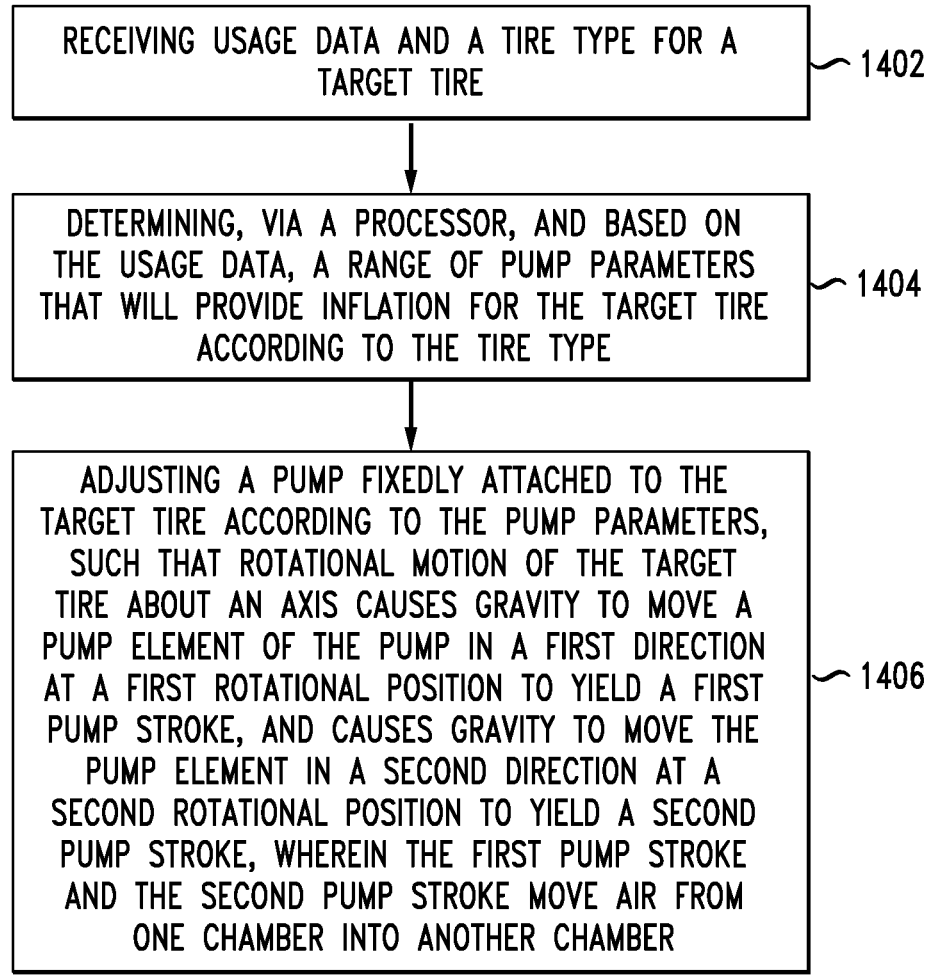
FIG. 14 illustrates an example method embodiment.

Having disclosed some basic system components and concepts, the disclosure now turns to the exemplary method embodiment shown in FIG. 14. For the sake of clarity, the method is described in terms of an exemplary system 100 as shown in FIG. 1 configured to practice the method. The steps outlined herein are exemplary and can be implemented in any combination thereof, including combinations that exclude, add, reorder, or modify certain steps.

FIG. 14 illustrates method including receiving usage data and a tire type for a target tire (1402), determining, via a processor, and based on the usage data, a range of pump parameters that will provide inflation for the target tire according to the tire type (1404) and adjusting a pump fixedly attached to the target tire according to the pump parameters (1406), such that rotational motion of the target tire about an axis causes gravity to move a pump element of the pump in a first direction at a first rotational position to yield a first pump stroke, and causes gravity to move the pump element in a second direction at a second rotational position to yield a second pump stroke, wherein the first pump stroke and the second pump stroke move air from one chamber into another chamber. In this manner, the pump will operate such that in one stroke, air is pumped into a volume such as a tire. The structure can also have two pumps in which while a first pump in one stroke is pumping air into a tire, the other pump in the same stroke will in "intake" mode and draw air into the second pump. The usage data can be used to identify a target tire pressure that the pump(s) need to work on to achieve.

Another example method embodiment includes utilizing a pressure threshold to control a pump connected to a rim that will pump air into a volumetric container upon rotational motion about an axis which causes gravity to move a pump element of the pump in a first direction at a first rotational position to yield a first pump stroke, and causes gravity to move the pump element in a second direction at a second rotational position to yield a second pump stroke. The first pump stroke and the second pump stroke move air from one chamber into another chamber. In this manner, the pump will operate to maintain the volumetric container at the pressure threshold.

The tire usage data can include at least one of driving data, recorded driving patterns, anticipated driving patterns, a driving category, a driving style, a personalized driving profile, a terrain, current and/or predicted weather conditions, a maximum speed, how often the tires stop and start rolling, distance traveled, a number of rotations, and acceleration data. The pump can be adjusted according to the pump parameters prior to installation on the target tire, at a time of installation on the target tire, or after installation on the target tire. Electronics can be incorporated to include a transceiver or a receiver such that any wireless protocol could be used to communicate data to an on-board storage device for adjusting the parameters of the pump. One of the pump, a valving structure and a pressure can be adjusted dynamically according to a plurality of factors. The pump can be adjusted by modifying at least one of a mass of the pump element, a stroke length, a direction of the pump, a pump width, and pump resistance.

While specific implementations are described herein, it should be understood that this is done for illustration purposes only. Other components and configurations may be used without parting from the spirit and scope of the disclosure.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

I claim:

1. A system comprising:
a tire rim being distal to an axis of the tire rim; and
a pump fixedly attached to an interior radial surface portion of the tire rim at a distal end of the tire rim which is away from a tire axis such that the pump itself rotates with the interior radial surface portion of the tire rim as the tire rim rotates, wherein rotational motion of the tire rim about the tire axis allows gravity to move a pump element in a first direction from a first position to a second position to yield a pump stroke, wherein the pump stroke pumps a gas into a volumetric container supported by pressure different from an ambient pressure outside of the volumetric container, the volumetric container mounted to the tire rim, wherein the pump comprises a plurality of masses, and wherein the pump is adjusted by fixing one or more masses of the plurality of masses in place preventing the one or more masses from moving as part of the pump stroke.

2. The system of claim 1, wherein the rotational motion of the tire rim about the axis causes gravity to move the pump element in a second direction from the second position to the first position to yield a second pump stroke.

3. The system of claim 2, wherein the pump stroke is an intake stroke and the second pump stroke is a compression stroke.

4. The system of claim 3, wherein repeating the rotational motion causes a change in pressure of the volumetric container.

5. The system of claim 1, wherein the pump is aligned perpendicularly to a centripetal acceleration vector from the tire axis.

6. The system of claim 1, wherein work captured by the pump element is due to gravity.

7. The system of claim 1, wherein the volumetric container is an inflatable tire and comprises at least one of a heavy machinery tire, a mass transportation tire, a truck tire, a bicycle tire, a consumer car tire, and a motorcycle tire.

8. The system of claim 1, wherein the pump has a pump stroke path that is one of linear and angular along the rotational motion of the tire rim.

9. The system of claim 1, wherein the pump is perpendicular to a radial line defined from the tire axis to an edge of the tire rim.

10. The system of claim 1, wherein the pump element is an element that slides inside a volume.

11. The system of claim 10, wherein the element is a piston that moves in the pump stroke in such a way as to move air from one chamber into another chamber.

12. The system of claim 11, wherein moving air from the one chamber to the another chamber results in one of pumping air into the volumetric container or pumping air out of the volumetric container.

13. The system of claim 1, wherein the pump element moves in such a way as to generate electricity which is stored in a storage device.

14. The system of claim 1, wherein the pump element is a non-solid mass that presses against a diaphragm.

15. The system of claim 1, further comprising a plurality of pumps.

16. The system of claim 15, wherein each pump of the plurality of pumps is positioned with an equal angular distance between other pumps of the plurality of pumps, resulting in a balancing of the plurality of pumps.

17. The system of claim 15, wherein the plurality of pumps are positioned so that the tire rim and the volumetric container are rotationally balanced.

18. The system of claim 1, wherein the pumping element at a rotational speed above 10 miles per hour will settle into a position that aids in balancing the volumetric container.

19. A computer-readable storage device having instructions stored which, when executed by a computing device, causes the computing device to perform operations comprising:
receiving, from a sensor associated with a tire, an indication of pressure within the tire;
determining, based on usage data, a target tire pressure for the tire; and
initiating a pump fixedly attached to an interior radial portion of a tire rim, such that rotational motion of the tire about an axis causes gravity to move a pump element of the pump in a first direction at a first rotational position to yield a first pump stroke, and causes gravity to move the pump element in a second direction at a second rotational position to yield a second pump stroke, wherein the first pump stroke and the second pump stroke move air from one chamber into another chamber, thereby moving air associated with the tire until the target tire pressure is reached, wherein the pump comprises a plurality of masses, and wherein the pump is adjusted by fixing one or more masses of the plurality of masses in place preventing the one or more masses from moving as part of the first pump stroke or the second pump stroke.

20. A method comprising:
receiving usage data and a tire type for a target tire;
determining, via a processor, and based on the usage data, a range of pump parameters that will provide inflation for the target tire according to the tire type; and
adjusting a pump fixedly attached to an interior radial portion of a tire rim according to the pump parameters, such that rotational motion of the target tire about an axis causes gravity to move a pump element of the pump in a first direction at a first rotational position to yield a first pump stroke, and causes gravity to move the pump element in a second direction at a second rotational position to yield a second pump stroke, wherein the first pump stroke and the second pump stroke move air from one chamber into another chamber, wherein the pump comprises a plurality of masses, and wherein the pump is adjusted by fixing one or more masses of the plurality of masses in place preventing the one or more masses from moving as part of as part of the first pump stroke or the second pump stroke.

21. The method of claim 20, wherein the usage data comprises at least one of driving data, recorded driving patterns, anticipated driving patterns, a driving category, a driving style, a personalized driving profile, a terrain, current and/or predicted weather conditions, a maximum speed, how often tires stop and start rolling, distance traveled, a number of rotations, and acceleration data.

22. The method of claim 20, wherein the pump is adjusted according to the pump parameters prior to installation on the target tire, at a time of installation on the target tire, or after installation on the target tire.

23. The method of claim 20, wherein the pump is adjusted by modifying at least one of a mass of the pump element, a stroke length, a direction of the pump, a pump width, and pump resistance.

* * * * *